(12) United States Patent
Webb

(10) Patent No.: US 9,862,042 B1
(45) Date of Patent: Jan. 9, 2018

(54) CHAINSAW GUIDE BAR MOUNTING DEVICE

(71) Applicant: Ishmel Webb, Seminole, OK (US)

(72) Inventor: Ishmel Webb, Seminole, OK (US)

( * ) Notice: Subject to any disclaimer, the term of this patent is extended or adjusted under 35 U.S.C. 154(b) by 0 days.

(21) Appl. No.: 15/466,555

(22) Filed: Mar. 22, 2017

(51) Int. Cl.
*B23D 63/16* (2006.01)
*B23D 63/00* (2006.01)

(52) U.S. Cl.
CPC ......... *B23D 63/003* (2013.01); *B23D 63/166* (2013.01)

(58) Field of Classification Search
CPC ... B23D 63/003; B23D 63/166; B23D 63/168
See application file for complete search history.

(56) References Cited

U.S. PATENT DOCUMENTS

| | | | | |
|---|---|---|---|---|
| 2,217,145 A | 10/1940 | Stihl | | |
| 2,353,956 A | 7/1944 | Enholm | | |
| 2,392,563 A | * 1/1946 | Wilson | .................... | B23D 63/02 76/46 |
| 2,413,919 A | * 1/1947 | Franklin | .............. | B23D 63/162 76/78.1 |
| 2,415,137 A | * 2/1947 | Johnson | ............... | B23D 63/003 33/202 |
| 2,422,871 A | 6/1947 | Wilson | | |
| 2,480,546 A | * 8/1949 | Bryson | ................ | B23D 63/162 76/47.1 |
| 2,589,165 A | * 3/1952 | Albert | ................... | B23D 63/003 451/349 |
| 2,821,097 A | 1/1958 | Carlton | | |
| 2,911,857 A | * 11/1959 | Orlando | .................... | B24B 3/40 451/419 |
| 3,260,287 A | * 7/1966 | Oehrli | .................. | B23D 63/168 30/123.4 |
| 3,269,431 A | * 8/1966 | Ehlen | .................... | B23D 63/168 30/123.4 |
| 3,435,860 A | * 4/1969 | Silvon | .................. | B23D 63/168 76/37 |
| 3,457,969 A | * 7/1969 | Carter | .................. | B23D 63/168 30/123 |
| 3,465,617 A | * 9/1969 | Silvon | .................. | B23D 63/168 30/138 |
| 3,487,591 A | * 1/1970 | Silvon | .................. | B23D 63/168 30/138 |
| 3,502,122 A | * 3/1970 | Silvon | .................. | B23D 63/168 30/138 |

(Continued)

FOREIGN PATENT DOCUMENTS

EP 2666572 A1 * 11/2013 ........... B23D 63/008

*Primary Examiner* — Michael Safavi

(57) ABSTRACT

A chain saw guide bar mounting device for facilitating maintenance of a cutting chain includes a first plate that is configured to mount to a support structure. A second plate that is coupled to the first plate extends longitudinally from proximate to a first end of the first plate. Each of a pair of couplers coupled to the second plate is configured to couple to a respective penetration that is positioned in a guide bar of a chain saw. A bracket, which is slidably coupled to the first plate, is positioned between the second plate and a second end of the first plate. A second rod is selectively couplable to the bracket. A hub is axially positioned on and rotationally coupled to the second rod. The hub is positioned to rotationally couple to a cutting chain that is positioned on the guide bar to position the cutting chain for maintenance.

14 Claims, 5 Drawing Sheets

(56) References Cited

U.S. PATENT DOCUMENTS

| | | | |
|---|---|---|---|
| 4,102,223 A | 7/1978 | Robinson et al. | |
| 4,104,793 A * | 8/1978 | Simington | B23D 63/164 30/139 |
| D271,276 S | 11/1983 | Reynolds | |
| 4,416,169 A | 11/1983 | Silvey | |
| 4,535,667 A * | 8/1985 | Gibson | B23D 63/168 76/80.5 |
| 4,597,178 A * | 7/1986 | Dolata | B23D 63/168 30/138 |
| 2011/0030223 A1* | 2/2011 | Seigneur | B23D 63/168 30/138 |
| 2012/0222313 A1* | 9/2012 | Seigneur | B23D 63/168 30/138 |
| 2014/0123499 A1* | 5/2014 | Martinsson | B23D 63/168 30/138 |
| 2017/0232537 A1* | 8/2017 | Lynn | B23D 63/166 76/80.5 |

* cited by examiner

CHAINSAW GUIDE BAR MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mounting devices and more particularly pertains to a new mounting device for facilitating maintenance of a cutting chain.

BRIEF SUMMARY OF THE INVENTION

An embodiment of the disclosure meets the needs presented above by generally comprising a first plate that is configured to mount to a support structure. A second plate that is coupled to the first plate extends longitudinally from proximate to a first end of the first plate. Each of a pair of couplers coupled to the second plate is configured to couple to a respective penetration that is positioned in a guide bar of a chain saw. A bracket, which is slidably coupled to the first plate, is positioned between the second plate and a second end of the first plate. A second rod is selectively couplable to the bracket. A hub is axially positioned on and rotationally coupled to the second rod. The hub is positioned to rotationally couple to a cutting chain that is positioned on the guide bar to position the cutting chain for maintenance.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
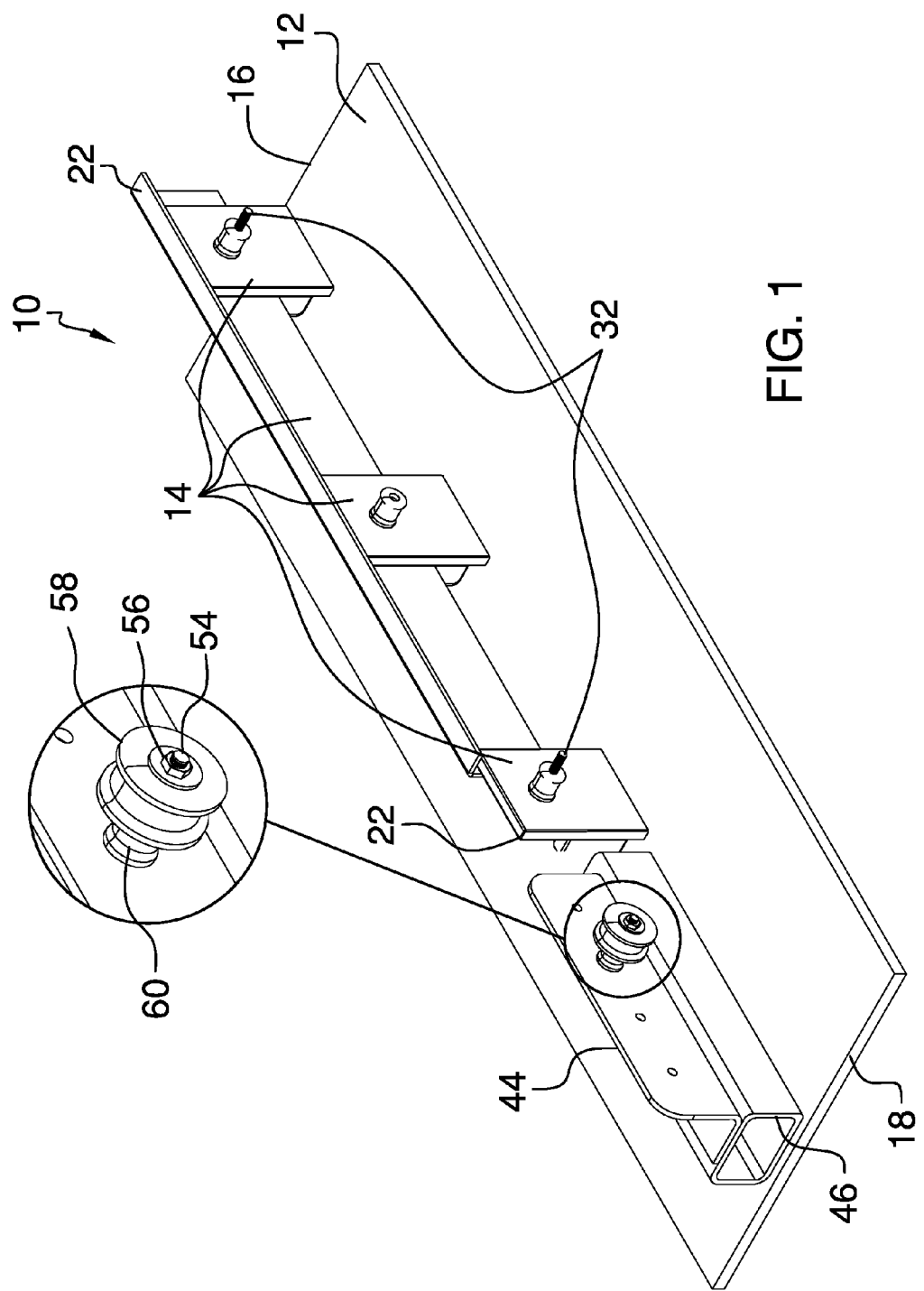
FIG. 1 is an isometric perspective view of a chain saw guide bar mounting device according to an embodiment of the disclosure.
Figure 2:
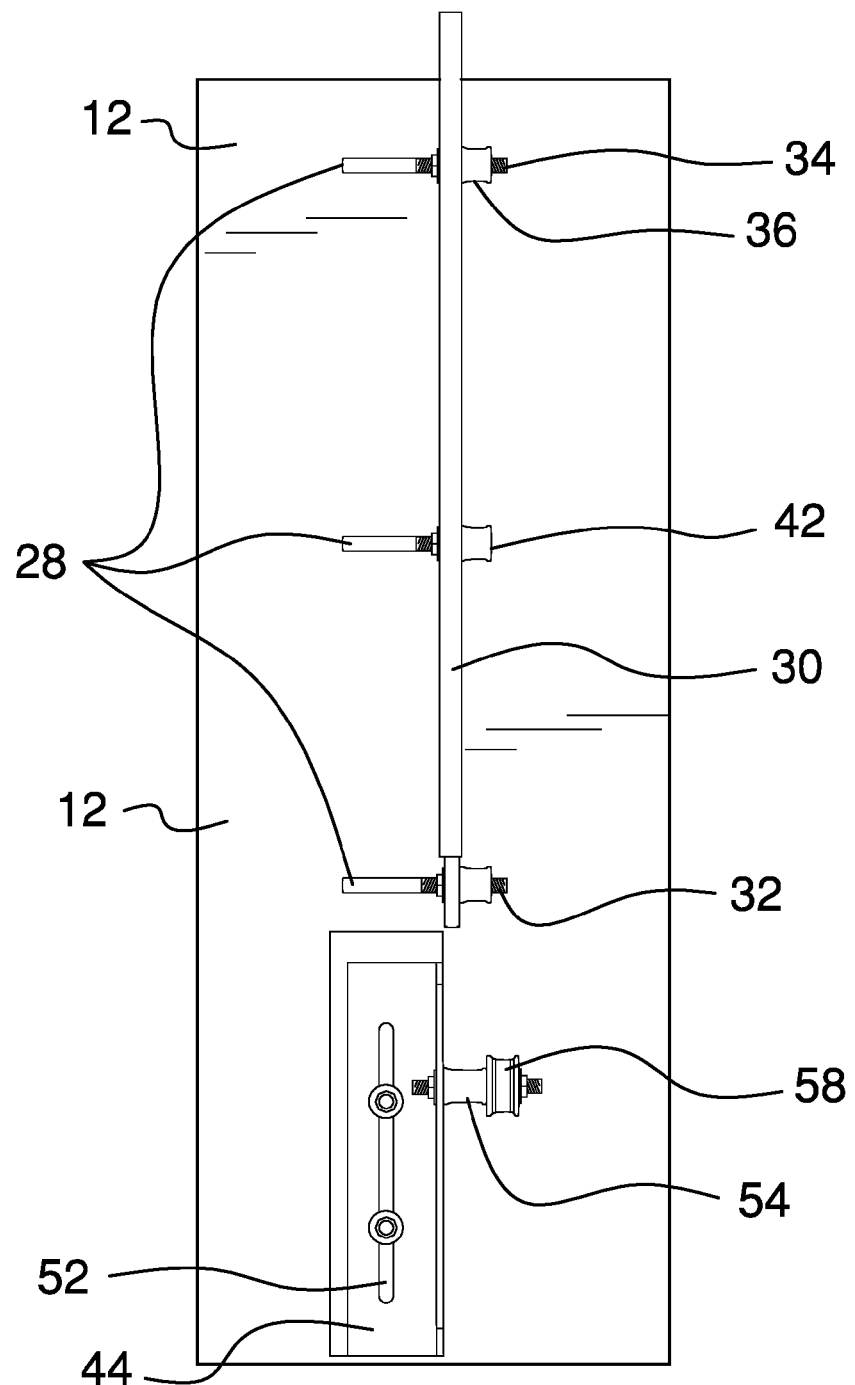
FIG. 2 is a top view of an embodiment of the disclosure.
Figure 3:
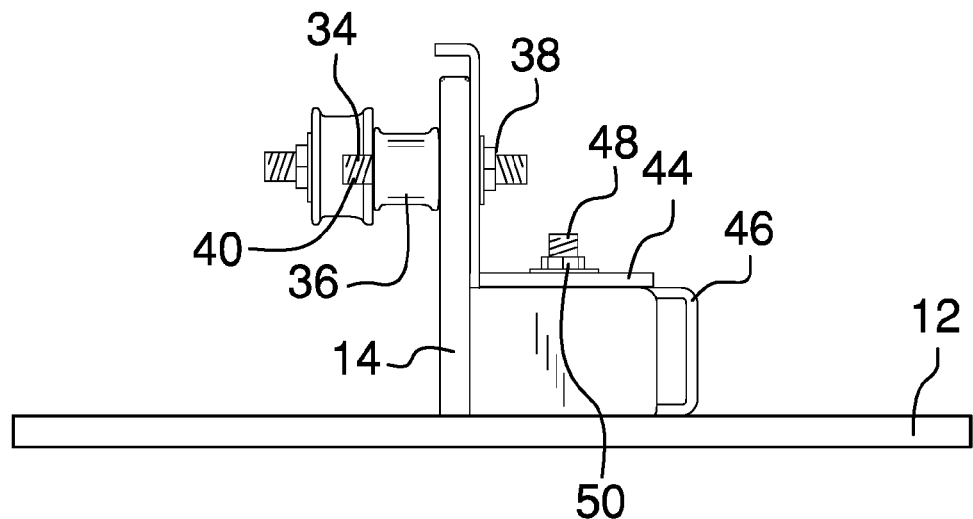
FIG. 3 is an end view of an embodiment of the disclosure.
Figure 4:
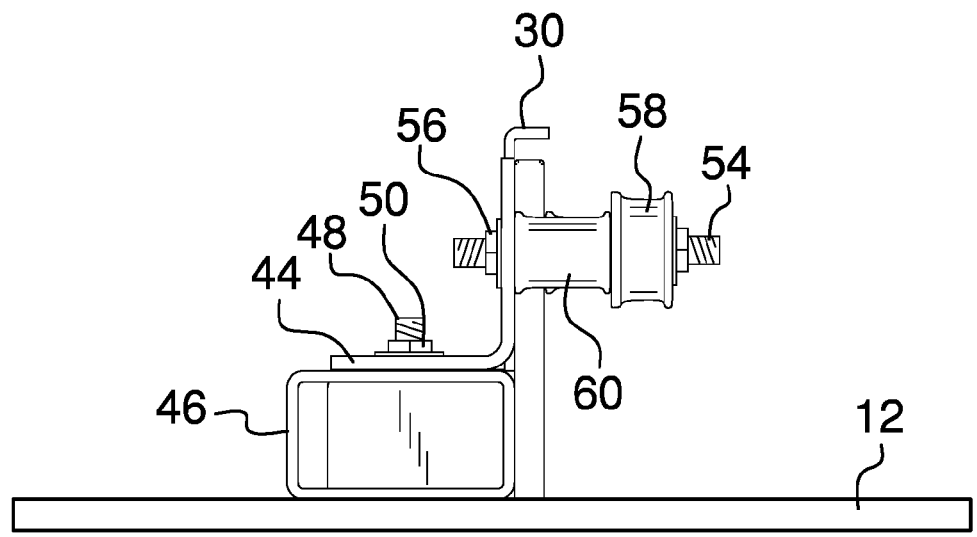
FIG. 4 is an end view of an embodiment of the disclosure.
Figure 5:
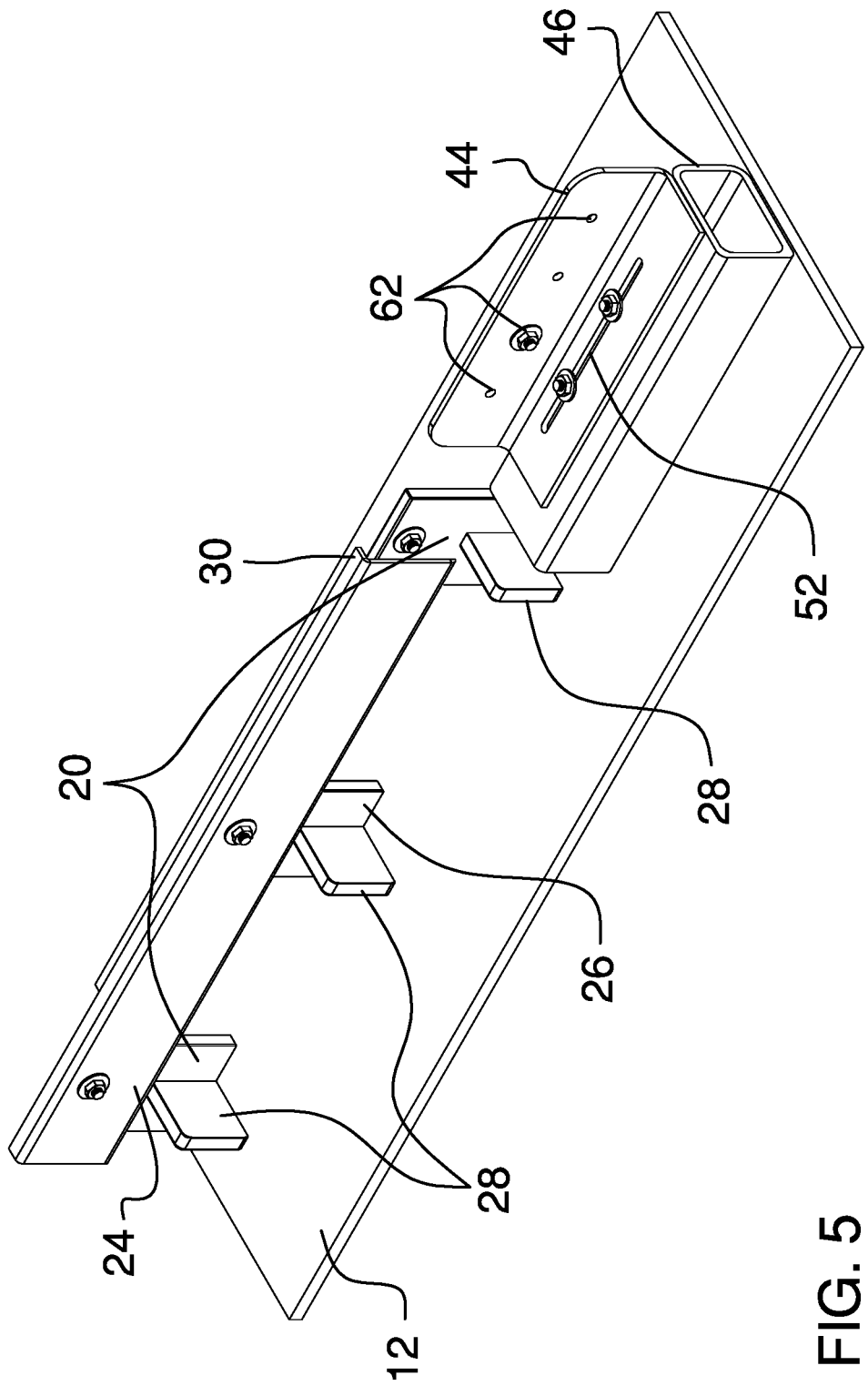
FIG. 5 is an isometric perspective view of an embodiment of the disclosure.
Figure 6:
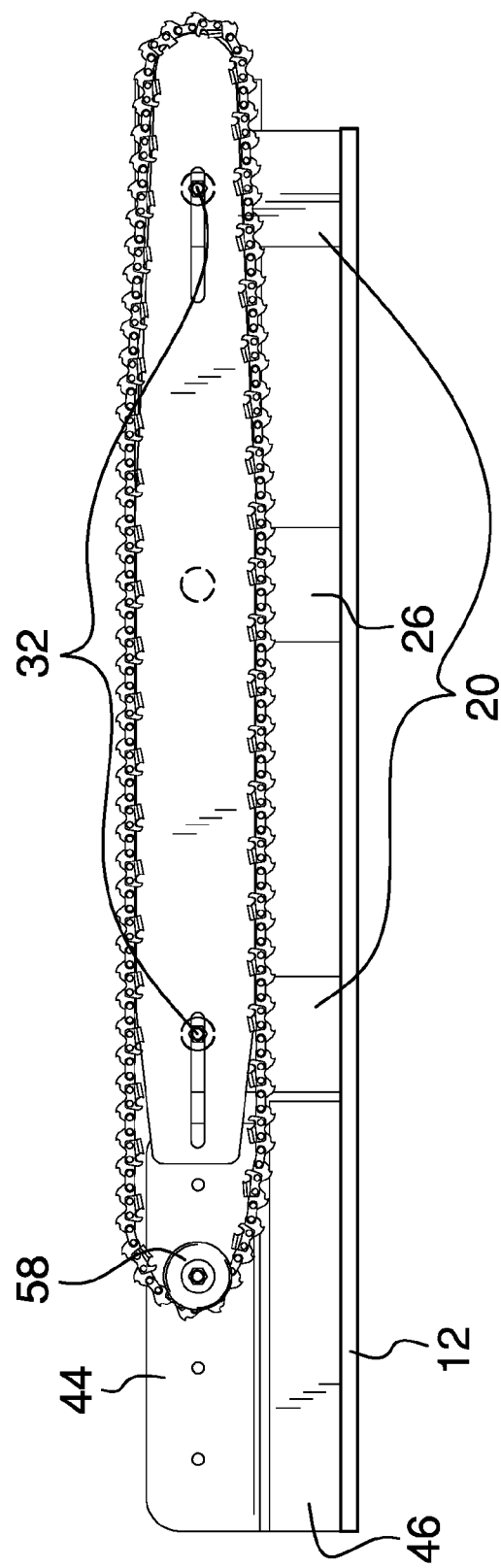
FIG. 6 is an in-use view of an embodiment of the disclosure.

With reference now to the drawings, and in particular to FIGS. 1 through 6 thereof, a new mounting device embodying the principles and concepts of an embodiment of the disclosure and generally designated by the reference numeral 10 will be described.

As best illustrated in FIGS. 1 through 6, the chain saw guide bar mounting device 10 generally comprises a first plate 12 that is configured to mount to a support structure, such as a table. In one embodiment, the first plate 12 is rectangularly shaped.

A second plate 14 is coupled to and extends perpendicularly from the first plate 12. The second plate 14 extends longitudinally along the first plate 12 from proximate to a first end 16 of the first plate 12 toward a second end 18 of the first plate 12.

In one embodiment, the second plate 14 comprises a pair of first panels 20. Each first panel 20 is coupled to and extends perpendicularly from the first plate 12 to define opposing ends 22 of the second plate 14. In another embodiment, the second plate 14 comprises a second panel 24 that is coupled to and extends between the pair of first panels 20. In yet another embodiment, the second plate 14 comprises a third panel 26. The third panel 26 is positioned substantially equally distant from the pair of first panels 20.

In one embodiment, the device 10 comprises a set of third plates 28. The third plates 28 are coupled singly to the pair of first panels 20 and the third panel 26. The third plates 28 are coupled to the first plate 12. The third plates 28 are positioned to stabilize the pair of first panels 20 and the third panel 26 relative to the first plate 12. In another embodiment, a lip 30 is coupled to and extends perpendicularly from the second panel 24. The lip 30 is opposingly positioned relative to the third plates 28.

Each of a pair of couplers 32 is coupled to and extends perpendicularly from the second plate 14. Each coupler 32 is complementary to a respective penetration that is positioned in a guide bar of a chain saw assembly. The couplers 32 are configured to couple to the penetrations in the guide bar to couple the guide bar to the second plate 14. The guide bar is positioned substantially perpendicularly to the first plate 12.

In one embodiment, the couplers 32 are positioned singly on the pair of first panels 20. In another embodiment, each coupler 32 comprises a bolt 34, a first tube 36, and a first nut 38. The first tube 36 is positioned around the bolt 34 such that a threaded section 40 of the bolt 34 is positioned distal from the first panel 20. The first nut 38 is reversibly couplable to the threaded section 40. The first tube 36 is configured to abut the guide bar to separate the guide bar from the first panel 20. The first nut 38 is positioned to couple to the threaded section 40 of the bolt 34 to couple the guide bar to the first panel 20.

A second tube 42 is coupled to and extends perpendicularly from the third panel 26. The second tube 42 is configured to abut and stabilize the guide bar that is coupled to the first panels 20.

A bracket 44 is slidably coupled to and extends perpendicularly from the first plate 12. The bracket 44 is positioned between the second plate 14 and the second end 18 of the first plate 12. In one embodiment, the bracket 44 is L-shaped when viewed longitudinally.

In another embodiment, a fourth tube 46 is positioned between the bracket 44 and the first plate 12. The fourth tube 46 is fixedly coupled to the first plate 12. Each of a pair of first rods 48 is coupled to and extends from the fourth tube 46. The first rods 48 are threaded. Each of a pair of second nuts 50 is complementary to the first rods 48 such that each second nut 50 is reversibly couplable to a respective first rod 48. A slit 52 is positioned longitudinally in the bracket 44. The slit 52 is positioned to insert the first rods 48. The bracket 44 is variably positionable relative to the second plate 14 and the second end 18 of the first plate 12. The first rods 48 are positioned to couple to the second nuts 50 to selectively couple the bracket 44 to the fourth tube 46.

A second rod 54 is selectively couplable to the bracket 44. The second rod 54 extends perpendicularly the bracket 44. The second rod 54 is variably horizontally positionable relative to the pair of couplers 32. A hub 58 is axially positioned on the second rod 54. The hub 58 is rotationally coupled to the second rod 54. The hub 58 is positioned to rotationally couple to a cutting chain that is positioned on the guide bar. The cutting chain is positioned for maintenance, such as sharpening.

A third tube 60 is positioned around the second rod 54. The third tube 60 is positioned between the bracket 44 and the hub 58. The third tube 60 is positioned to separate the cutting chain from the bracket 44.

In one embodiment, the second rod 54 is threaded. A third nut 56, which is complementary to the second rod 54, is reversibly couplable to the second rod 54. A plurality of holes 62 is positioned in the bracket 44. The holes 62 are complementary to the second rod 54. The holes 62 are positioned in the bracket 44 such that each hole 62 is positioned to selectively insert the second rod 54. The second rod 54 is positioned to reversibly couple to the third nut 56 to couple the second rod 54 to the bracket 44. The second rod 54 is variably horizontally positionable relative to the pair of couplers 32.

In use, the first tubes 36 are configured to abut the guide bar to separate the guide bar from the first panels 20. The first nuts 38 are positioned to couple to the threaded sections 40 of the bolts 34 to couple the guide bar to the first panels 20. The second tube 42, which is coupled to the third panel 26, is configured to abut and stabilize the guide bar that is coupled to the first panels 20. The slit 52 that is positioned in the bracket 44 is positioned to insert the first rods 48. The bracket 44 is variably positionable relative to the second plate 14 and the second end 18 of the first plate 12. The first rods 48 are positioned to couple to the second nuts 50 to selectively couple the bracket 44 to the fourth tube 46. The holes 62 are positioned in the bracket 44 such that each hole 62 is positioned to selectively insert the second rod 54. The second rod 54 is positioned to reversibly couple to the third nut 56 to couple the second rod 54 to the bracket 44. The second rod 54 is variably horizontally positionable relative to the pair of couplers 32. The third tube 60, which is positioned on the second rod 54, is positioned to separate the cutting chain from the bracket 44. The hub 58, which is positioned on the second rod 54, is positioned to rotationally couple to the cutting chain that is positioned on the guide bar. The cutting chain is positioned for maintenance, such as sharpening.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chain saw guide bar mounting device comprising:
   a first plate configured for mounting to a support structure, such as a table;
   a second plate coupled to and extending perpendicularly from said first plate, said second plate extending longitudinally along said first plate from proximate to a first end of said first plate toward a second end of said first plate;
   a pair of couplers coupled to and extending perpendicularly from said second plate, each said coupler being complementary to a respective penetration positioned in a guide bar of a chain saw assembly;
   a bracket slidably coupled to and extending perpendicularly from said first plate, said bracket being positioned between said second plate and said second end of said first plate;
   a second rod selectively couplable to said bracket, said second rod extending perpendicularly said bracket;
   a hub axially positioned on said second rod, said hub being rotationally coupled to said second rod; and
   wherein said couplers are positioned on said second plate such that said couplers are configured for coupling to penetrations in the guide bar to couple the guide bar to said second plate positioning the guide bar substantially perpendicular to said first plate, wherein said second rod is positioned on said bracket such that said second rod is variably horizontally positionable relative to said pair of couplers, wherein said hub is positioned on said second rod such that said hub is positioned for rotationally coupling to a cutting chain positioned on the guide bar such that the cutting chain is positioned for maintenance, such as sharpening.

2. The device of claim 1, further including said first plate being rectangularly shaped.

3. The device of claim 1, further including said second plate comprising a pair of first panels, each said first panel being coupled to and extending perpendicularly from said first plate defining opposing ends of said second plate.

4. The device of claim 3, further including said second plate comprising a second panel coupled to and extending between said pair of first panels.

5. The device of claim 4, further including said second plate comprising a third panel, said third panel being positioned substantially equally distant from said pair of first panels.

6. The device of claim 5, further including a set of third plates, said third plates being coupled singly to said pair of first panels and said third panel, said third plates being coupled to said first plate such that said third plates are positioned for stabilizing said pair of first panels and said third panel relative to said first plate.

7. The device of claim 6, further including a lip coupled to and extending perpendicularly from said second panel, said lip being opposingly positioned relative to said third plates.

8. The device of claim 3, further including said couplers being positioned singly on said pair of first panels.

9. The device of claim 8, further including each said coupler comprising a bolt, a first tube, and a first nut, said first tube being positioned around said bolt such that a threaded section of said bolt is positioned distal from said first panel, said first nut being reversibly couplable to said threaded section, wherein said first tube is positioned on said bolt such that said first tube is configured for abutting the guide bar for separating the guide bar from said first panel, wherein said first nut is positioned for coupling to said threaded section of said bolt to couple the guide bar to said first panel.

10. The device of claim 5, further including a second tube coupled to and extending perpendicularly from said third panel, wherein said second tube is positioned on said third panel such that said second tube is configured for abutting and stabilizing the guide bar coupled to said first panels.

11. The device of claim 1, further including said bracket being L-shaped when viewed longitudinally.

12. The device of claim 11, further comprising:
a fourth tube positioned between said bracket and said first plate, said fourth tube being fixedly coupled to said first plate;
a pair of first rods coupled to and extending from said fourth tube, said first rods being threaded;
a pair of second nuts, said second nuts being complementary to said first rods such that each said second nut is reversibly couplable to a respective said first rod;
a slit positioned longitudinally in said bracket; and
wherein said slit is positioned in said bracket such that said slit is positioned for inserting said first rods such that said bracket is variably positionable relative to said second plate and said second end of said first plate, wherein said first rods are positioned for coupling to said second nuts to selectively couple said bracket to said fourth tube.

13. The device of claim 11, further comprising:
said second rod being threaded;
a third nut, said third nut being complementary to said second rod such that said third nut is reversibly couplable to said second rod;
a third tube positioned around said second rod, said third tube being positioned between said bracket and said hub, wherein said third tube is positioned on said second rod such that said third tube is positioned for separating the cutting chain from said bracket;
a plurality of holes positioned in said bracket, said holes being complementary to said second rod; and
wherein said holes are positioned in said bracket such that each said hole is positioned for selectively inserting said second rod positioning said second rod for reversibly coupling to said third nut to couple said second rod to said bracket such that said second rod is variably horizontally positionable relative to said pair of couplers.

14. A chain saw guide bar mounting device comprising:
a first plate configured for mounting to a support structure, such as a table, said first plate being rectangularly shaped;
a second plate coupled to and extending perpendicularly from said first plate, said second plate extending longitudinally along said first plate from proximate to a first end of said first plate toward a second end of said first plate, said second plate comprising a pair of first panels, each said first panel being coupled to and extending perpendicularly from said first plate defining opposing ends of said second plate, said second plate comprising a second panel coupled to and extending between said pair of first panels, said second plate comprising a third panel, said third panel being positioned substantially equally distant from said pair of first panels;
a set of third plates, said third plates being coupled singly to said pair of first panels and said third panel, said third plates being coupled to said first plate such that said third plates are positioned for stabilizing said pair of first panels and said third panel relative to said first plate;
a lip coupled to and extending perpendicularly from said second panel, said lip being opposingly positioned relative to said third plates;
a pair of couplers coupled to and extending perpendicularly from said second plate, each said coupler being complementary to a respective penetration positioned in a guide bar of a chain saw assembly, wherein said couplers are positioned on said second plate such that said couplers are configured for coupling to penetrations in the guide bar to couple the guide bar to said second plate positioning the guide bar substantially perpendicular to said first plate, said couplers being positioned singly on said pair of first panels, each said coupler comprising a bolt, a first tube, and a first nut, said first tube being positioned around said bolt such that a threaded section of said bolt is positioned distal from said first panel, said first nut being reversibly couplable to said threaded section, wherein said first tube is positioned on said bolt such that said first tube is configured for abutting the guide bar for separating the guide bar from said first panel, wherein said first nut is positioned for coupling to said threaded section of said bolt to couple the guide bar to said first panel;
a second tube coupled to and extending perpendicularly from said third panel, wherein said second tube is positioned on said third panel such that said second tube is configured for abutting and stabilizing the guide bar coupled to said first panels;

a bracket slidably coupled to and extending perpendicularly from said first plate, said bracket being positioned between said second plate and said second end of said first plate, said bracket being L-shaped when viewed longitudinally;

a fourth tube positioned between said bracket and said first plate, said fourth tube being fixedly coupled to said first plate;

a pair of first rods coupled to and extending from said fourth tube, said first rods being threaded;

a pair of second nuts, said second nuts being complementary to said first rods such that each said second nut is reversibly couplable to a respective said first rod;

a slit positioned longitudinally in said bracket, wherein said slit is positioned in said bracket such that said slit is positioned for inserting said first rods such that said bracket is variably positionable relative to said second plate and said second end of said first plate, wherein said first rods are positioned for coupling to said second nuts to selectively couple said bracket to said fourth tube;

a second rod selectively couplable to said bracket, said second rod extending perpendicularly said bracket, wherein said second rod is positioned on said bracket such that said second rod is variably horizontally positionable relative to said pair of couplers, said second rod being threaded;

a third nut, said third nut being complementary to said second rod such that said third nut is reversibly couplable to said second rod;

a hub axially positioned on said second rod, said hub being rotationally coupled to said second rod, wherein said hub is positioned on said second rod such that said hub is positioned for rotationally coupling to a cutting chain positioned on the guide bar such that the cutting chain is positioned for maintenance, such as sharpening;

a third tube positioned around said second rod, said third tube being positioned between said bracket and said hub, wherein said third tube is positioned on said second rod such that said third tube is positioned for separating the cutting chain from said bracket;

a plurality of holes positioned in said bracket, said holes being complementary to said second rod, wherein said holes are positioned in said bracket such that each said hole is positioned for selectively inserting said second rod positioning said second rod for reversibly coupling to said third nut to couple said second rod to said bracket such that said second rod is variably horizontally positionable relative to said pair of couplers; and wherein said first tubes are positioned on said bolts such that said first tubes are configured for abutting the guide bar for separating the guide bar from said first panels, wherein said first nuts are positioned for coupling to said threaded sections of said bolts to couple the guide bar to said first panels, wherein said second tube is positioned on said third panel such that said second tube is configured for abutting and stabilizing the guide bar coupled to said first panels, wherein said slit is positioned in said bracket such that said slit is positioned for inserting said first rods such that said bracket is variably positionable relative to said second plate and said second end of said first plate, wherein said first rods are positioned for coupling to said second nuts to selectively couple said bracket to said fourth tube, wherein said holes are positioned in said bracket such that each said hole is positioned for selectively inserting said second rod positioning said second rod for reversibly coupling to said third nut to couple said second rod to said bracket such that said second rod is variably horizontally positionable relative to said pair of couplers, wherein said third tube is positioned on said second rod such that said third tube is positioned for separating the cutting chain from said bracket, wherein said hub is positioned on said second rod such that said hub is positioned for rotationally coupling to the cutting chain positioned on the guide bar such that the cutting chain is positioned for maintenance, such as sharpening.

* * * * *